Sept. 13, 1955  C. A. KLINE  2,717,414
FISH HOLDERS
Filed Dec. 8, 1952

INVENTOR.
Charles A. Kline,
BY
Morsell & Morsell
Attys.

United States Patent Office 2,717,414
Patented Sept. 13, 1955

2,717,414

FISH HOLDERS

Charles A. Kline, South Milwaukee, Wis.

Application December 8, 1952, Serial No. 324,661

1 Claim. (Cl. 17—8)

This invention relates to improvements in fish holders.

It is a principal object of the present invention to provide an improved fish holder for use in holding a fish while the latter is being cleaned and scaled, said holder being sufficiently compact to be a tackle box item.

A further object of the invention is to provide an improved fish holder of the class described having means for ready detachable securement to a work surface.

A further object of the invention is to provide an improved fish holder of the class described which has a relatively small number of parts, the manufacture of which can be carried out inexpensively with relatively simple stamping and assembly operations.

A further object of the invention is to provide an improved fish holder of the class described which is strong and durable, neat in appearance, compact, simple to operate, and which is otherwise well adapted for the purposes described.

With the above and other objects in view, the invention consists of the improved fish holder and all of its parts and combinations set forth in the claim, and all equivalents thereof.

In the drawing accompanying and forming a part of this specification, wherein is shown one complete embodiment of the preferred form of the invention, and wherein like characters of reference indicate the same parts in all of the views.

Figure 1:
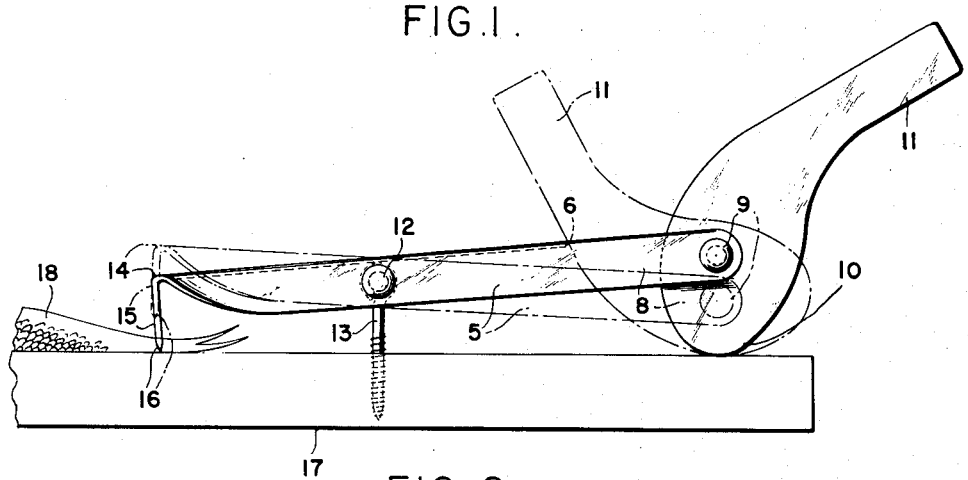
Fig. 1 is a side elevational view of the improved fish holder operatively secured to a work surface and holding a fish against said surface in a position to be scaled and cleaned.
Figure 2:
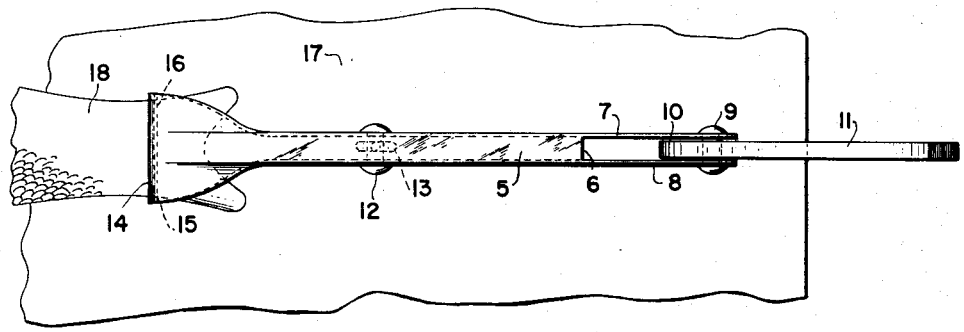
Fig. 2 is a plan view of the holder of Fig. 1.

Referring more particularly to the drawing, the numeral 5 indicates an elongated bar which is channel shaped for the major portion of its length. At one end the web of the channel-shaped bar 5 is cut away to form an elongated longitudinal slot 6 on the sides of which are longitudinally projecting ears 7 and 8 formed by the side flanges of said bar. Said ears 7 and 8 are formed with alined transverse apertures providing bearings for a transverse pin 9. Pivotally mounted on the pin 9 between the ears 7 and 8 is a cam plate 10 having a handle 11.

Intermediate the ends of the bar 5 the side flanges thereof are formed with alined transverse apertures forming bearings for a pin 12. A screw eye 13 is pivotally mounted on pin 12 between the flanges of bar 5. At the end of bar 5 opposite the cam 10 the flanges of said bar are spread outwardly into the plane of the web of said bar, and the flattened portion is bent along a transverse fold line 14 to form a flat jaw 15 extending substantially normal to the web of bar 5. The transverse edge of jaw 15 is serrated at 16.

Figure 3:
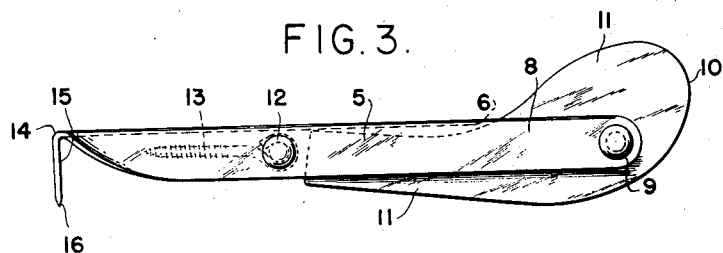
Fig. 3 is a side elevational view of the improved holder in collapsed inoperative condition ready for storage in a tackle box.

This cam 10 can be swung to the inoperative position of Fig. 3 wherein the handle 11 lies between the flanges of bar 5 adjacent the web thereof. It will also be noted that the screw eye 13 can be swung to the position of Fig. 3 entirely within the flanges of bar 5 and adjacent the web of said bar. When the parts of the improved holder are disposed as shown in Fig. 3, said holder is compact and is of a size well suited for storage in a fisherman's tackle box.

In the use of the improved fish holder, the screw eye 13 is swung outwardly normal to bar 5 and is screwed into a selected work surface 17 (Fig. 1). The latter may be any suitable flat surface, preferably wooden, such as a board, tree stump, work bench, or the like. With the cam handle 11 swung to the dot and dash line position of Fig. 1, the screw eye 13 is turned into surface 17 until the edge 16 is at a selected height above said surface when the cam 10 engages the latter. This height varies with the size of the fish to be cleaned.

With the parts of the holder positioned as shown in dot and dash lines in Fig. 1, the tail of a fish 18 to be cleaned or scaled is placed under the jaw 15, and the handle 11 is swung to the right, as viewed in Fig. 1, to the solid line position shown. This movement causes bar 5 to pivotally move about the pin 12 and also causes jaw 15 to securely clamp the fish 18 between the serrated edge 16 and the surface 17. When it is desired to release the fish, it is only necessary to swing the handle 11 to the dot and dash line position of Fig. 1 to thereby raise the jaw 15 away from the surface 17.

When the cleaning operation has been completed, the screw eye 13 is unscrewed from surface 17, and the parts swung to the inoperative position of Fig. 3. The improved holder is then ready to be returned to the tackle box or otherwise conveniently stored until re-use is desired.

Various changes and modifications may be made without departing from the spirit of the invention, such as changes in the specific shape of cam 11 or of bar 5. It is also obvious that other types of connection members may be used in place of the screw eye 13 where desirable. All of such changes are contemplated as may come within the scope of the claim.

What I claim as the invention is:

A foldable fish holder, comprising: an elongated, rectilinear channel-shaped bar having a web portion with side flanges, a laterally directed jaw on one end, and a cut-away web portion at its other end, the latter forming from the side flange portions there-adjacent a pair of ears; a cam plate pivotally mounted between said ears, said cam plate being formed with an integral handle; and a screw eye pivotally connected to an intermediate portion of said bar between the side flanges thereof, said screw eye being removably connectable to a work surface in a manner to pivotally mount said bar in spaced relation to said surface with said cam engageable with said surface whereby rotation of said cam in one direction while in engagement with said surface tilts the bar in a manner to urge said jaw toward said surface, said cam being swingable to an inoperative position wherein the handle is disposed coextensive with said channel-shaped bar and between said side flanges and adjacent the web of said bar between the cut-away web portion and the pivotal mounting for said screw eye, and said screw eye also being swingable to an inoperative position within said channel-shaped bar and directed toward the jaw, said screw eye and handle being positionable in substantial alinement.

References Cited in the file of this patent

UNITED STATES PATENTS

| | | |
|---|---|---|
| 2,300,321 | Swezey | Oct. 27, 1942 |
| 2,511,592 | Krafczyk | June 13, 1950 |
| 2,542,343 | Merrill | Feb. 20, 1951 |

FOREIGN PATENTS

| | | |
|---|---|---|
| 20,572 | Great Britain | 1891 |
| 123,817 | Sweden | Nov. 18, 1948 |